United States Patent [19]

Gulas et al.

[11] Patent Number: 4,766,098

[45] Date of Patent: Aug. 23, 1988

[54] METHOD OF PROTECTING A COAL GASIFIER PART FROM ATTACK BY LIQUID SLAGS

[76] Inventors: Hans-Jurgen Gulas, Magnesitstrasse 6, A-8707 Leoben; Josef Horak, Otto Weininger-G. 6, A-1130 Vienna; Horst Sulzbacher, Dirnbockweg 5, A-8700 Leoben, all of Austria; Gero Papst, Wendelin Ernst-Strasse 9, A-7580 Buhl-Weitenung, Fed. Rep. of Germany

[21] Appl. No.: 16,541

[22] Filed: Feb. 19, 1987

Related U.S. Application Data

[60] Continuation of Ser. No. 813,711, Dec. 27, 1985, abandoned, which is a division of Ser. No. 674,957, Oct. 11, 1984, abandoned.

[30] Foreign Application Priority Data

Feb. 15, 1983 [AT] Austria ..................... 511/83

[51] Int. Cl.⁴ ..................... C04B 35/52; C04B 35/04
[52] U.S. Cl. ..................... 501/101; 501/108; 501/109
[58] Field of Search ............ 501/108, 101, 109; 422/241; 266/280

[56] References Cited

U.S. PATENT DOCUMENTS

| | | | |
|---|---|---|---|
| 3,287,144 | 11/1966 | Hodl et al. | 501/101 |
| 4,210,453 | 7/1980 | Bowers | 501/101 |
| 4,248,638 | 2/1981 | Yomota et al. | 501/101 |
| 4,454,239 | 6/1984 | Cassens, Jr. | 501/101 |

FOREIGN PATENT DOCUMENTS

2521080 11/1975 Fed. Rep. of Germany.
8176172 10/1983 Japan ..................... 501/101

OTHER PUBLICATIONS

C.A., vol. 98, No. 16, Apr. 18, 1983, Columbus, Ohio, p. 304, Abstract 131282q, JP,A, 57183360.
C.A., vol. 94, No. 18, May 4, 1981, Shimada et al., "Application of Unburned Magnesium Carbon Brick for Ladle Furnace", p. 292, Abstract 144174y, 1980.
Henson, "Special Refractories", Refractories Division, Norton Co., pp. 64–69, May 1947.
McGannon, *The Making, Shaping and Treating of Steel,* Ninth Edition, 1971, p. 473.

*Primary Examiner*—Mark L. Bell
*Assistant Examiner*—Karl Group
*Attorney, Agent, or Firm*—Kurt Kelman

[57] ABSTRACT

Coal gasifiers for the production of reducing gas are protected—at least in parts—by a refractory lining of unburned, carbonaceous magnesia bricks having a carbon content of 5 to 30 percent by weight. The component of these magnesia bricks consisting of sinter and/or fused magnesia suitably has a $Fe_2O_3$ content below 6 percent by weight, preferably below 1.5 percent by weight, and a $SiO_2$ content below 3 percent by weight, preferably below 1 percent by weight.

3 Claims, No Drawings

METHOD OF PROTECTING A COAL GASIFIER PART FROM ATTACK BY LIQUID SLAGS

This application is a continuation of application Ser. No. 813,711, filed Dec. 27, 1985, abandoned, which in turn is a divisional application of U.S. application Ser. No. 674,957, filed Oct. 11, 1984, abandoned.

The present invention relates to a method of protecting a part of a coal gasifier for the production of reducing gas from attack by liquid slags having a molar ratio of $CaO/SiO_2$ below 2.

According to the process described in EP-B 0 010 627, liquid pig iron and reducing gas are produced in a smelter gasifier by melting hot sponge iron particles, possibly with additive materials, to liquid pig iron or steel precursor material, the heat required for the melting operation as well as reducing gas being produced from feed coal and oxygenous gas blown in above the melt. During this process, a fluidised bed of coal is formed in the smelter gasifier, the temperature in the lower region of the fluidised bed being maintained at a value in the range of 2000° to 2500° C. by introducing the oxygenous gas, the temperature gradually dropping towards the upper region of the fluidised bed to a value in the range of 1000° to 1400° C., and the height of the bed being at least 1.5 meters, so that a residence time of several seconds is ensured even for larger sponge iron particles by the dynamic pressure and uplift force of the fluidised bed.

This process can also be operated without the feeding of sponge iron, thus producing reducing gas only.

The refractory lining of the coal gasifiers used for this process is subjected to heavy thermal and chemical wear which is mainly caused by the attack of acid slags due to the presence of coal ashes, these slags having a molar ratio of $CaO/SiO_2$ below 2, mostly far below 2, as well as by the abrasion and corrosion of the refractory bricks.

The fire clay or high alumina refractories commonly used for pig iron production and coal gasification are not suited for these severe conditions. Higher quality materials such as corundum, chrome corundum or picrochromite bricks have rendered better results than the above mentioned brick qualities, but their service life has not been satisfactory, either. The disadvantage of graphite bricks is their high thermal conductivity, causing excessive heat losses due to heat dissipation through the walls. Insulating the cold brick end will not solve this problem, as the hot end brick temperature will rise and accelerate wear.

It is an object of this invention to provide a method of protecting a part of such coal gasifiers from attack by the above-mentioned liquid slags by lining the coal gasifier part with a refractory lining which does not have the disadvantages of the conventional refractory lining materials but has properties enabling it to withstand the specific stresses occurring in coal gasifiers.

According to the invention, this object is accomplished with a lining which consists of unburned, carbonaceous magnesia bricks having a carbon content of 5 to 30 percent, by weight.

Unburned, carbonaceous magnesia products have been applied in various types of steel melting furnaces. In these applications, temperatures are mostly in excess of 1600° C., and the refractories are heavily attacked by basic slags with a molar ratio of $CaO/SiO_2$ above 2. The high service life they achieve is due to their good resistance to chemicals, their high thermal conductivity and their excellent resistance to thermal shocks.

These brick types are manufactured from sinter and/or fused magnesia having a grain size of up to 8 mm, with the addition of a solid carbon carrier, such as carbon black, graphite or coke, and are subsequently pitch or resin bonded.

Up to now, bricks manufactured in this way have not been applied in furnaces used for pig iron production or in coal gasification.

The wearing conditions in the above mentioned coal gasifiers differ largely from those in steel melting furnaces. As mentioned earlier, the main kinds of wear are the attack by acid slags as well as the abrasion and erosion of the bricks, whereas thermal shocks are less frequent due to the continuous operation of coal gasifiers.

In view of these wearing conditions, a successful application of unburned, carbonaceous magnesia bricks could not be expected, as acid slags in general heavily corrode carbonaceous magnesia bricks. Further, the abrasion and erosion resistance of unburned products is normally substantially below that of burned qualities.

The surprising results of a trial application showed, however, that unburned carbonaceous magnesia bricks are very well suited for the use in coal gasifiers.

According to a preferred feature of the invention, the component of the unburned, carbonaceous magnesia bricks, which consists of sinter and/or fused magnesia, has a $Fe_2O_3$ content below 6 percent by weight and a $SiO_2$ content below 3 percent by weight. The wearing results will be even better if the sinter and/or fused magnesia component of the magnesia bricks has a $Fe_2O_3$ content below 1.5 percent by weight and a $SiO_2$ content below 1 percent by weight.

The invention is explained in more detail by the following examples:

EXAMPLE 1

The following materials were used for producing unburned, carbonaceous magnesia bricks:

|  | Fused Magnesia | Sinter Magnesia |
| --- | --- | --- |
| $SiO_2$ | 0.87% by wt. | 0.44% by wt. |
| $Fe_2O_3$ | 0.57% by wt. | 0.14% by wt. |
| $Al_2O_3$ | 0.24% by wt. | 0.08% by wt. |
| CaO | 1.79% by wt. | 2.06% by wt. |
| MgO (difference) | 96.52% by wt. | 97.24% by wt. |
| $B_2O_3$ | 0.012% by wt. | 0.044% by wt. |

These materials were mixed according to the following formula:

| | | |
| --- | --- | --- |
| Fused Magnesia | 3.0–5.0 mm | 10% by wt. |
| | 1.0–3.0 mm | 23% by wt. |
| | 0–1.0 mm | 16% by wt. |
| Sinter Magnesia | 3.0–5.0 mm | 5% by wt. |
| | 1.0–3.0 mm | 18% by wt. |
| | 0–0.1 mm | 15% by wt. |
| Flake Graphite (85–90% by wt. C) | | 13% by wt. |

5 percent by weight of phenolic resin were used as a bonding agent.

The bricks were compacted with a pressure of 125 N/mm² and hardened in a subsequent thermal treatment.

These bricks were installed in a smelter gasifier together with nitride bonded corundum bricks; after two months of operation, they showed a slight and uniform wear of approximately 10 mm whereas the nitride bonded corundum bricks had an irregular appearance with a wear of up to 50 mm.

EXAMPLE 2

For another brick quality, the following sinter magnesia was used:

| | |
|---|---|
| $SiO_2$ | 0.11% by wt. |
| $Fe_2O_3$ | 0.07% by wt. |
| $Al_2O_3$ | 0.12% by wt. |
| CaO | 0.88% by wt. |
| MgO (difference) | 98.81% by wt. |
| $B_2O_3$ | 0.005% by wt. |

This magnesia was mixed according to the following formula:

| | | |
|---|---|---|
| Grain size: | 3.0–5.0 mm | 30% by wt. |
| | 1.0–3.0 mm | 35% by wt. |
| | 0–1.0 mm | 15% by wt. |
| | 0–0.1 mm | 12% by wt. |
| Flake Graphite (90–96% by wt. C) | | 4% by wt. |
| Carbon Black | | 4% by wt. |

The bonding agent used was 2 percent by weight of briquetting pitch with a softening point according to the Kraemer-Sarnow method of 68° C.

The bricks were compacted with a pressure of 140 N/mm$^2$ and heat treated for 4 hours at 300° C.

These bricks were installed in a coal gasifier together with nitride bonded corundum bricks and with bricks manufactured according to Example 1. They showed a heavier rate of wear than the bricks of example 1, but were significantly better than the nitride bonded corundum bricks.

What is claimed is:

1. A method of protecting a part of a coal gasifier for the production of reducing gas from attack by liquid slags having a molar ratio of $CaO/SiO_2$ below 2, which comprises the step of lining said coal gasifier part with a refractory lining consisting of unburned, carbonaceous magnesia bricks having a carbon content of 5 to 30 percent, by weight.

2. The method of claim 1, wherein the bricks have at least one magnesia component consisting of sinter magnesia and fused magnesia, the magnesia component having a $Fe_2O_3$ content below 6 percent, by weight, and a $SiO_2$ content below 3 percent, by weight.

3. The method of claim 2, wherein the $Fe_2O_3$ content is below 1.5 percent, by weight, and the $SiO_2$ content is below 1 percent, by weight.

* * * * *